(12) United States Patent
Nagatsuyu et al.

(10) Patent No.: US 7,516,617 B2
(45) Date of Patent: Apr. 14, 2009

(54) MASTER CYLINDER

(75) Inventors: Yasutoshi Nagatsuyu, Minami-ALPS (JP); Tomonori Mouri, Kai (JP); Takato Ogiwara, Minami-ALPS (JP); Naganori Koshimizu, Kai (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 11/604,843

(22) Filed: Nov. 28, 2006

(65) Prior Publication Data
US 2007/0119167 A1 May 31, 2007

(30) Foreign Application Priority Data
Nov. 30, 2005 (JP) ............... 2005-346378

(51) Int. Cl.
*B60T 11/20* (2006.01)
(52) U.S. Cl. ..................................... 60/562
(58) Field of Classification Search ............... 60/547.1, 60/562, 588; 91/376 R
See application file for complete search history.

(56) References Cited

U.S. PATENT DOCUMENTS 5,142,965 A * 9/1992 Zander ..................... 60/562
5,908,097 A * 6/1999 Grosspietsch et al. ..... 192/91 A

FOREIGN PATENT DOCUMENTS

JP 6-33765 5/1994

* cited by examiner

*Primary Examiner*—Michael Leslie
(74) *Attorney, Agent, or Firm*—Wenderoth, Lind & Ponack, L.L.P.

(57) ABSTRACT

A master cylinder including a cylinder body having a tubular shape with a closed end; and a piston having one side slidably inserted into the cylinder body and another side that projects from the cylinder body. The piston and the cylinder body define a pressure chamber for generating hydraulic pressure. The master cylinder also includes a protecting member for covering the side of the piston projects from the cylinder body. The protecting member is adapted to extend and contract, and limit backward movement of the piston.

20 Claims, 4 Drawing Sheets

MASTER CYLINDER

BACKGROUND OF THE INVENTION

Technical Field

The present invention relates to a master cylinder for supplying brake fluid to a brake system of a motor vehicle.

Master cylinders for supplying brake fluid to a brake system of a motor vehicle include overhang-type master cylinders designed for reduced size, weight and so on. The overhang-type master cylinders have a piston that projects from their cylinder body. Some of the overhang-type master cylinders are provided with a rubber cover on an exposed portion of the piston projecting from the cylinder body in order to avoid any damage of the exposed portion when they are shipped, mounted on a booster, or the like (see, for example, Japanese Utility Model Public Disclosure No. HEI 6-33765).

With use of a rubber cover in such an overhang-type master cylinder, however, the piston may exceed the limit of a backward movement due to stretching of the rubber cover when the piston moves back in a situation such as when the master cylinder is filled with brake fluid. To prevent this, a need arises for a separate stopper to limit the backward movement of the piston. As a result, the structure of the master cylinder becomes complicated, and assemblage becomes unfavorable.

SUMMARY OF THE INVENTION

Therefore, an object of the present invention is to provide a master cylinder that is capable of preventing damage of the exposed portion of the piston projecting from the cylinder body, and that has a simple structure, so that efficiency in assemblage can be improved.

The present invention provides a master cylinder comprising: a cylinder body having a tubular shape with a closed end; a piston having one side thereof slidably inserted into the cylinder body and another side thereof projecting from the cylinder body, the piston and the cylinder body defining a pressure chamber for generating hydraulic pressure; and a protecting member for covering said another side of the piston projecting from the cylinder body, the protecting member being adapted to extend and contract and limit a backward movement of the piston.

Further, the present invention provides a protecting member for covering one side of a piston projecting from a cylinder body of a master cylinder, the protecting member comprising: a first cover member having one side and another side, said one side being attached to the cylinder body; a second cover member having one side and another side, the second cover member and the first cover member being adapted to cover said one side of the piston projecting from the cylinder body, wherein said one side of the second cover member is slidably engaged with said another side of the first cover member, whereby the protecting member is capable of extending and contracting, and wherein the protecting member having a restricting member for preventing the second cover member from being removed from the first cover member and for limiting a backward movement of the piston relative to the cylinder body.

DETAILED DESCRIPTION OF THE PREFERRED EMBODIMENTS

Below, the master cylinder of the first embodiment of the present invention will be described with reference to FIGS. 1 to 4.

Figure 1:
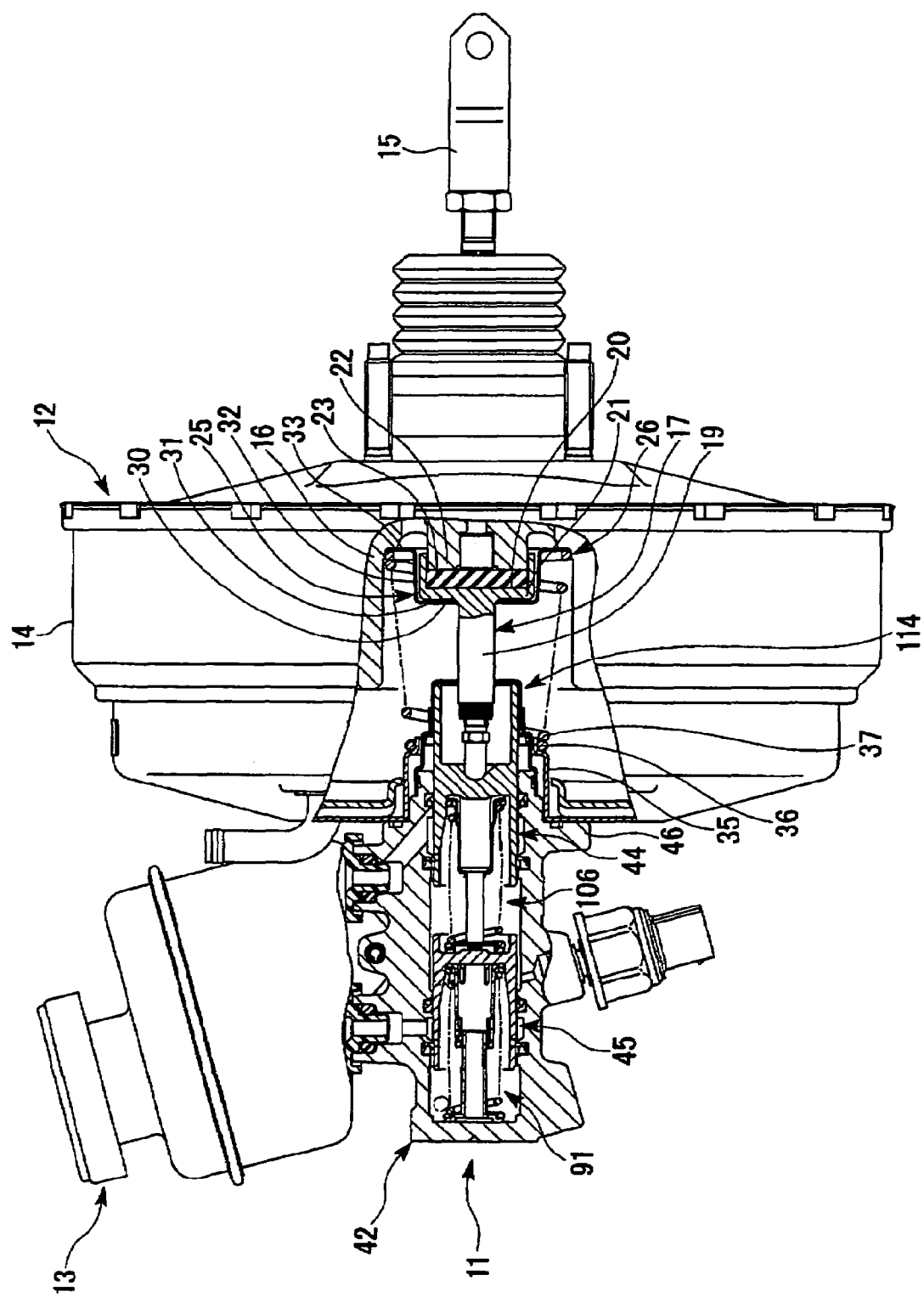
FIG. 1 is a cross-sectional view of a master cylinder of a first embodiment of the present invention when it is mounted on a booster.

A master cylinder 11 in FIG. 1 is adapted to generate a hydraulic braking pressure according to an operating amount of a brake pedal (not shown) boosted by a booster 12, and is provided thereabove with a reservoir 13 for supplying and storing brake fluid.

The booster 12 comprises: an outer shell 14; an input rod 15 connected to the brake pedal (not shown) and adapted to move in an axial direction according to a degree to which the brake pedal is stepped; a power piston 16 for utilizing a negative pressure of an engine to boost an input to the input rod 15, that is, a stepping force exerted on the brake pedal; and an output rod 17 disposed coaxially with the input rod 15 on a side of the power piston 16 opposite to the input rod 15 and caused to move by a pressing force of the power piston 16.

The output rod 17 comprises: a shaft 19; and a fitting portion 21 having a diameter larger than the shaft 19 and including a fitting recess 20 that is open to a side opposite to the shaft 19. A fitting projection 22 of the power piston 16, which is provided on a side opposite to the input rod 15, is slidably fitted into the fitting recess 20. It is to be noted that a reaction disc 23 is provided between the fitting recess 20 of the output rod 17 and the fitting projection 22 of the power piston 16. Further, a spring engagement cover 25 is provided so as to cover the fitting portion 21 of the output rod 17 on a side of the shaft 19. Between the spring engagement cover 25 and the shell 14 is provided a return spring 26 for urging the output rod 17 and the power piston 16 toward the input rod 15.

The spring engagement cover 25 comprises: a disc portion 31 provided at a center thereof with an insertion hole 30 for inserting the shaft 19 of the output rod 17 and adapted to abut against an end surface of the fitting portion 21 of the output rod 17 on a side of the shaft 19; a cylindrical portion 32 extending from an outer circumferential edge of the disc portion 31 so as to cover an outer circumference of the fitting portion 21 of the output rod 17; and a flange 33 projecting radially outward from a side of the cylindrical portion 32 opposite to the disc portion 31. The flange 33 is engaged with an end of the return spring 26. On the other hand, the shell 14 comprises: a mounting cylindrical portion 35 disposed on an outer end surface opposite to the input rod 15 and formed to be recessed from the outer end surface toward the input rod 15; a stepped portion 36 projecting in a radially inward direction from an axially inward edge of the mounting cylindrical portion 35; and a reduced cylindrical portion 37 projecting from an inner circumferential portion of the stepped portion 36 toward an opposite side to the mounting cylindrical portion 35 and having a diameter slightly smaller than that of the mounting cylindrical portion 35. The other end of the return spring 26 is engaged with the stepped portion 36, such that the reduced cylindrical portion 37 is inserted into the return spring 26.

Figure 2:
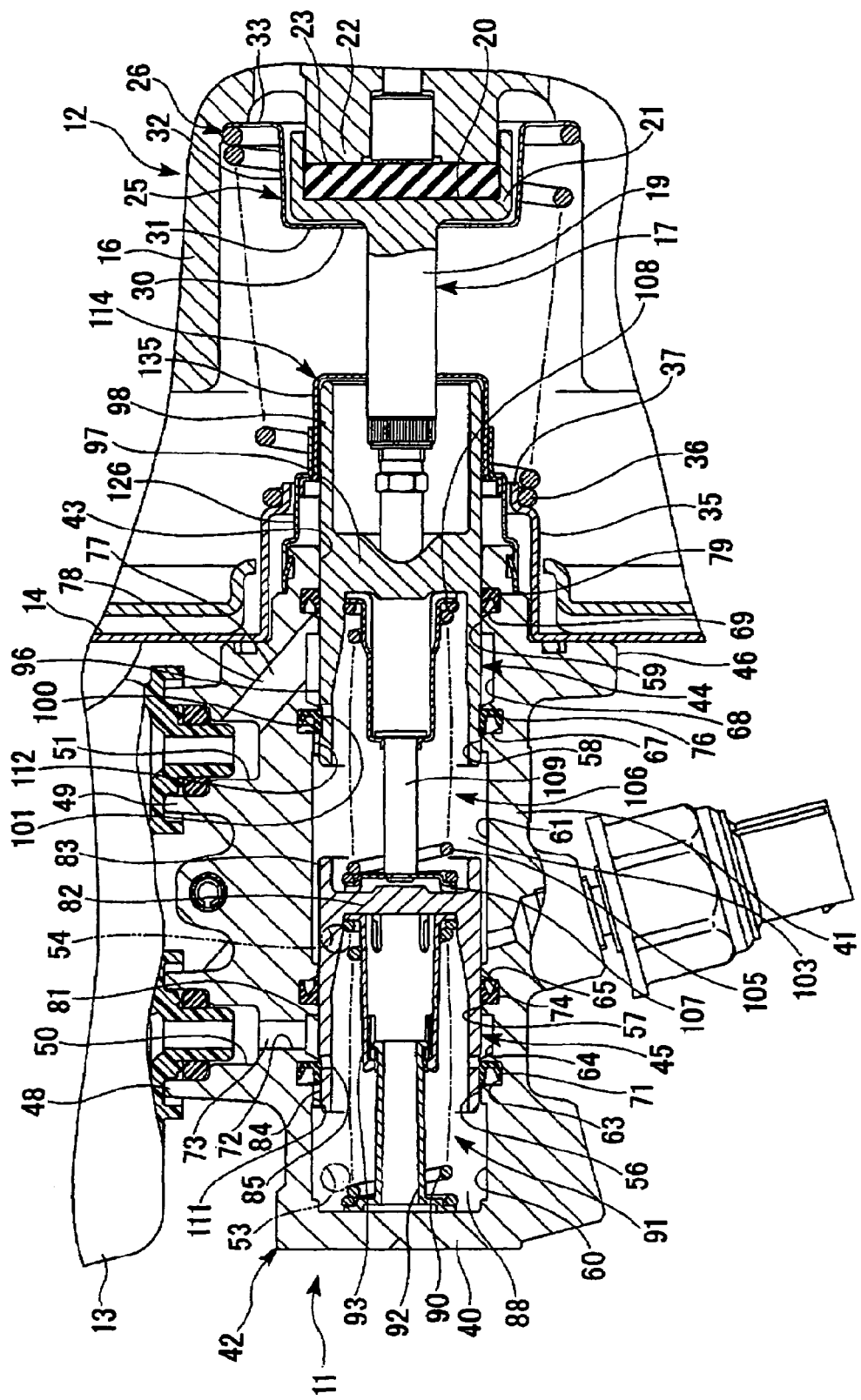
FIG. 2 is a cross-sectional view of the master cylinder of the first embodiment of the present invention, and a part of the booster.

As shown in FIG. 2, the master cylinder 11 is of a tandem type comprising: a cylinder body 42 formed of a single material and shaped into a tubular shape with a closed end having a bottom portion 40 and a cylindrical portion 41; a primary piston (piston) 44 inserted into the cylinder body 42 and disposed on a side of an opening 43 of the cylinder body 42 so as to be capable of sliding along an axis of a cylindrical portion 41 of the cylinder body 42 (hereinafter referred to as a cylinder axis); and a secondary piston 45 inserted into the cylinder body 42 and disposed on a side of the cylinder body 42 closer than the primary piston 44 to the bottom portion 40 so as to be capable of sliding along the cylinder axis. Further, a part of the master cylinder 11 on a side of the opening 43 of the cylinder body 42 is inserted into the mounting cylindrical portion 35 of the booster 12 and mounted on the shell 14 of the booster 12, such that a flange 46 on a side of the opening 43 of the cylindrical portion 41 abuts against an outer end surface of the shell 14 of the booster 12.

The cylinder body 42 has two mounting bases 48 and 49 integrally formed with an upper portion of the cylindrical portion 41 so as to project radially outward of the cylindrical portion 41 (hereinafter referred to as a cylinder radial direction), and disposed side by side along the cylinder axis. The mounting bases 48 and 49 have mounting holes 50 and 51 for mounting the reservoir 13, respectively. The positions of the mounting holes 48 and 49 correspond to each other in a circumferential direction of the cylindrical portion 41 (hereinafter referred to as a cylinder circumferential direction).

A secondary outlet 53 and a primary outlet 54 are formed in the cylindrical portion 41 of the cylinder body 42 on a side of the mounting bases 48 and 49. The secondary and primary outlets 53 and 54 are connected to a brake pipe (not shown) for supplying brake fluid to the brake system (not shown). The positions of the secondary and primary outlets 53 and 54 correspond to each other in the cylinder circumferential direction and displaced from each other in the cylinder axial direction.

Slidable inner diameter portions 56 and 57 for slidably engaging with the secondary piston 45 are formed in the positions of the cylindrical portion 41 of the cylinder body 42 on a side close to the bottom portion 40, the slidable inner diameter portion 56 being closer than the slidable inner diameter portion 57 to the bottom portion 40. On the other hand, slidable inner diameter portions 58 and 59 for slidably engaging with the primary piston 44 are formed in positions of the cylindrical portion 41 of the cylindrical body 42 on a side closer to the opening 43, the slidable inner diameter portion 58 being closer than the slidable inner diameter portion 59 to the bottom portion 40. These slidable inner diameter portions 56 to 59 are coaxially formed with the same diameter.

The cylindrical portion 41 of the cylinder body 42 has an enlarged diameter portion 60 formed at a position between the slidable inner diameter portion 56 and the bottom portion 40. The enlarged diameter portion 60 is coaxial with the slidable inner diameter portion 56 and has a diameter larger than that of the sliding inner diameter portion 56. Further, an enlarged diameter portion 61 is formed at a position between the slidable inner diameter portions 57 and 58. The enlarged diameter portion 61 is coaxial with the slidable inner diameter portions 57 and 58 and has a diameter larger than those of the slidable inner diameter portions 57 and 58. The enlarged diameter portions 60 and 61 have the same diameter.

On the side of the cylindrical portion 41 of the cylinder body 42 close to the bottom portion 40, a seal circumferential groove 63 is formed in an intermediate position of the slidable inner diameter portion 56 in the cylinder axial direction. The seal circumferential groove 63 has an annular shape in the cylinder circumferential direction and is recessed outwardly in the cylinder radial direction. Further, an opening groove 64 is formed in a position between the sliding inner diameter portions 56 and 57. The opening groove 64 has an annular shape in the cylinder circumferential direction and is recessed outwardly into the cylinder radial direction. Further, a seal circumferential groove 65 is formed in an intermediate position of the sliding inner diameter portion 57 in the cylinder axial direction. The seal circumferential groove 65 has an annular shape in the cylinder circumferential direction and is recessed outwardly in the cylinder radial direction.

On the side of the cylindrical portion 41 of the cylinder body 42 close to the opening 43, a seal circumferential groove 67 is formed in an intermediate position of the slidable inner diameter portion 58 in the cylinder axial direction. The seal circumferential groove 67 has an annular shape in the cylinder circumferential direction and is recessed outwardly in the cylinder radial direction. Further, an opening groove 68 is formed in a position between the sliding inner diameter portions 58 and 59. The opening groove 68 has an annular shape in the cylinder circumferential direction and is recessed outwardly in the cylinder radial direction. Further, a seal circumferential groove 69 is formed in an intermediate position of the sliding inner diameter portion 59 in the cylinder axial direction. The seal circumferential groove 69 has an annular shape in the cylinder circumferential direction and is recessed outwardly toward the cylinder radial direction.

The seal circumferential groove 63 of the sliding inner diameter portion 56 of the cylinder body 42 is located in the vicinity of the mounting hole 50, the one on a side closer to the bottom portion 40. A piston seal 71 is fitted into this seal circumferential groove 63. The piston seal 71 is a cup seal of a C-shaped cross section having a lip on the inner and outer circumferences thereof. In the seal circumferential groove 63, an open side of the piston seal 71 faces the bottom portion 40.

The opening groove 64, which is located between the sliding inner diameter portions 56 and 57 of the cylinder body 42, has a communication hole 72 that communicates between the opening groove 64 and the mounting hole 50 on a side of the bottom portion 40. The opening groove 64 and the communication hole 72 communicate between the cylinder body 42 and the reservoir 13 and mainly constitutes a secondary supply passage 73 which always communicates to the reservoir 13.

A partition seal 74 is fitted into a seal circumferential groove 65 of the sliding inner diameter portion 57 of the cylinder body 42. The partition seal 74 is also a cup seal of a C-shaped cross section having a lip portion on the inner and outer circumferences thereof. In the seal circumferential groove 65, an open side of the partition seal 74 faces the opening 43.

The seal circumferential groove 67 of the sliding inner diameter portion 58 of the cylinder body 42 is located in the vicinity of the mounting hole 51 on a side of the opening 43. A piston seal 76 is fitted into this seal circumferential groove 67. This piston seal 76 is a cup seal of a C-shaped cross section having a lip portion on the inner and outer circumferences thereof. In the seal circumferential groove 67, an open side of the piston seal 76 faces the bottom portion 40.

The opening groove 68, which is located between the sliding inner diameter portions 58 and 59 of the cylinder body 42, has a communication hole 77 which communicates between the opening groove 68 and the mounting hole 51 on a side of the opening 43. The opening groove 68 and the communication hole 77 communicate between the cylinder body 42 and the reservoir 13 and mainly constitute a primary supply passage 78 that always communicates to the reservoir 13.

A partition seal 79 is fitted into the seal circumferential groove 69 of the sliding inner diameter portion 59 of the cylinder body 42. This partition seal 79 is also a cup seal of a C-shaped cross section having a lip portion on the inner and outer circumferences thereof. In the seal circumferential groove 69, an open side of the partition seal 79 faces the bottom portion 40.

The secondary piston 45, which is fitted into the cylinder body 42 and located on a side of the bottom portion 40 of cylinder body 42, comprises a long first cylindrical portion 81, a bottom portion 82 formed on one side of the first cylindrical portion 81 in an axial direction, and a short second cylindrical portion 83 formed on a side of the bottom portion 82 opposite to the first cylindrical portion 81. The secondary piston 45 is slidably fitted into the sliding inner diameter portions 56 and 57 of the cylinder body 42, such that the long first cylindrical portion 81 is positioned on a side of the bottom portion 40 of the cylinder body 42. Further, a stepped portion 84 having an annular shape with a diameter slightly smaller than the other parts is formed on an end portion of an outer circumference of the first cylindrical portion 81 opposite to the bottom portion 82. Further, a plurality of radial ports 85 are formed in the stepped portion 84 of the first cylindrical portion 81 on a side of the bottom portion 82 so as to penetrate in the cylinder radial direction.

A portion defined by the bottom portion 40 and the cylindrical portion 41 of the cylinder body 42, mainly the enlarged diameter portion 60, and the secondary piston 45 defines a secondary pressure chamber 88 for supplying a hydraulic pressure to the secondary outlet 53. The secondary pressure chamber 88 communicates with the secondary supply passage 73 when the ports 85 of the secondary piston 45 communicate with the opening groove 64. The piston seal 71, which is provided in the seal circumferential groove 63 on a side of the bottom portion 40 of the cylinder body 42, has an inner circumference surface that is adapted to make a sliding contact with an outer circumferential surface of the secondary piston 45. When the secondary piston 45 is at a position where the ports 85 are moved toward the bottom portion to pass the piston seal 71, the secondary pressure chamber 88 can be sealed from the secondary supply passage 73. That is, the communication between the secondary pressure chamber 88, and the secondary supply passage 73 and the reservoir 13 can be shut.

When the hydraulic pressure in the secondary pressure chamber 88 exceeds that in the secondary supply passage 73 (that is, the atmospheric pressure), the piston seal 71 shuts communication between the secondary pressure chamber 88, and the secondary supply passage 73 and the reservoir 13. On the other hand, when the hydraulic pressure in the secondary pressure chamber 88 becomes smaller than that in the secondary supply passage 73, the secondary pressure chamber 88 and the secondary supply passage 73 and the reservoir 13 are communicated, so that fluid can be supplied to the secondary pressure chamber 88.

Between the secondary piston 45 and the bottom portion 40 of the cylinder body 42 is provided a space adjusting portion 91 including a secondary-piston spring 90 for setting a certain space between the secondary piston 45 and the bottom portion 40 of the cylinder body 42 in an initial state in which a force is not input from the booster 12.

The space adjusting portion 91 comprises: a spring retainer 92 provided in abutting relation to the bottom portion 40 of the cylinder body 42; and a spring retainer 93 provided in abutting relation to the bottom portion 82 of the secondary piston 45 and engaged with the spring retainer 92 so as to be capable of sliding only within a certain range. The secondary-piston spring 90 is provided in a position between the spring retainers 92 and 93.

The primary piston 44, which is fitted into the cylinder body 42 and located on a side of the opening 43 of the cylinder body 42, comprises: a first cylindrical portion 96; a bottom portion 97 formed on one side of the first cylindrical portion 96 in an axial direction; and a second cylindrical portion 98 formed on a side of the bottom portion 97 opposite to the first cylindrical portion 96. The primary piston 44 is slidably fitted into the sliding inner diameter portions 58 and 59 of the cylinder body 42, such that the first cylindrical portion 96 is positioned on a side of the secondary piston 45 in the cylinder body 42. The shaft 19 of the output rod 17 of the booster 12 is inserted into the second cylindrical portion 98, such that the output rod 17 can press against the bottom portion 97.

At an end portion of an outer circumferential surface of the first cylindrical portion 96 opposite to the bottom portion 97 is provided an annular recess 100 having a diameter slightly smaller than the other parts. The recess 100 of the first cylindrical portion 96 has a plurality of radial ports 101 on a side of the bottom portion 97, the ports penetrating through the first cylindrical portion 96 in a radial direction.

A portion defined by the cylindrical portion 41 of the cylinder body 42, mainly the enlarged diameter portion 61, the primary piston 44, and the secondary piston 45 constitutes a primary pressure chamber (pressure chamber) 103 for supplying a hydraulic pressure to the primary outlet 54. When the primary piston 44 is in a position in which the ports 101 communicate with the opening groove 68, the primary pressure chamber 103 communicates with the primary supply passage 78. The piston seal 76, which is provided in the seal circumferential groove 67 of the cylinder body 42, has an inner circumferential surface which makes a slidable contact with an outer circumferential surface of the primary piston 44. When the primary piston 44 is in a position where the ports 101 are moved toward the bottom portion 40 to pass the piston seal 76, the primary pressure chamber 103 can be sealed from the primary supply passage 78. That is, the communication between the primary pressure chamber 103, and the primary supply passage 78 and the reservoir 13 can be shut.

When the hydraulic pressure in the primary pressure chamber 103 exceeds the hydraulic pressure (that is, the atmospheric pressure) in the primary supply passage 78, the piston seal 76 shuts the communication between the primary pressure chamber 103, and the primary supply passage 78 and the reservoir 13. On the other hand, when the hydraulic pressure in the primary pressure chamber 103 becomes smaller than that in the primary supply passage 78, the primary pressure chamber 103 and the primary supply passage 78 and the reservoir 13 are communicated, such that fluid can be supplied to the primary pressure chamber 103.

The partition seal 74 in the seal circumferential groove 65 is in slidable contact with the secondary piston 45 to seal the secondary pressure chamber 88 and the secondary supply passage 73 from the primary pressure chamber 103, while the partition seal 79 in the seal circumferential groove 69 is in a slidable contact with the primary piston 44 to seal the primary supply passage 78 and the primary pressure chamber 103 from the atmosphere.

Between the secondary piston 45 and the primary piston 44 is provided a space adjusting portion 106 including a primary-piston spring 105 for setting a certain space between the secondary piston 45 and the primary piston 44 in an initial state in which a force is not input from the booster 12.

The space adjusting portion 106 comprises: a spring retainer 107 provided in abutting relation to the bottom portion 82 of the secondary piston 45; a spring retainer 108 provided in abutting relation to the bottom portion 97 of the primary piston 44; and a shaft member 109 fixed at one end thereof to the spring retainer 107 and adapted to slide only in a certain range to support the spring retainer 108. The primary-piston spring 105 is provided in a position between the spring retainers 107 and 108.

In a portion of the sliding inner diameter portion 56 of the cylinder body 42 on a side closer than the seal circumferential groove 63 to the enlarged diameter portion 60, a communication groove 111 is recessed outwardly in the cylinder radial direction. The communication groove 111 has one end in the cylinder axial direction open to the seal circumferential groove 63 and the other end open to the enlarged diameter portion 60. The communication groove 111 provides a communication, via the secondary pressure chamber 88, between the secondary outlet 53 formed in the enlarged diameter portion 60 and the seal circumferential groove 63. The communication groove 111 has a diameter smaller than that of the sliding inner diameter portion 56, and an arc shape around an axis parallel to the axes of the sliding inner diameter portion 56 and the enlarged diameter portion 60, that is, the cylinder axis.

Similarly, in a portion of the sliding inner diameter portion 58 of the cylinder body 42 on a side closer than the seal circumferential groove 67 to the enlarged diameter portion 61, a communication hole 112 is recessed outwardly in the cylinder radial direction. The communication hole 112 has one end in the cylinder axial direction open to the seal circumferential groove 67 and the other end open to the enlarged diameter portion 61. The communication groove 112 provides a communication, via the primary pressure chamber 103, between the primary outlet 54 formed in the enlarged diameter portion 61 and the seal circumferential groove 67. The communication groove 112 also has a diameter smaller than that of the sliding inner diameter portion 58, and an arc shape around an axis parallel to the axes of the sliding inner diameter portion 58 and the enlarged diameter portion 61, that is, the cylinder axis.

As described above, the primary piston 44 is inserted into the cylinder body 42, such that the first cylindrical portion 96, a portion on one side of the primary piston 44 in the cylinder axial direction, is slidable. The second cylindrical portion 98 of the primary piston 44, which is located on an opposite side to the cylinder body 42 in the cylinder axial direction, projects from the cylinder body 42. This projecting portion is covered with a metal protecting member 114.

Figure 3:
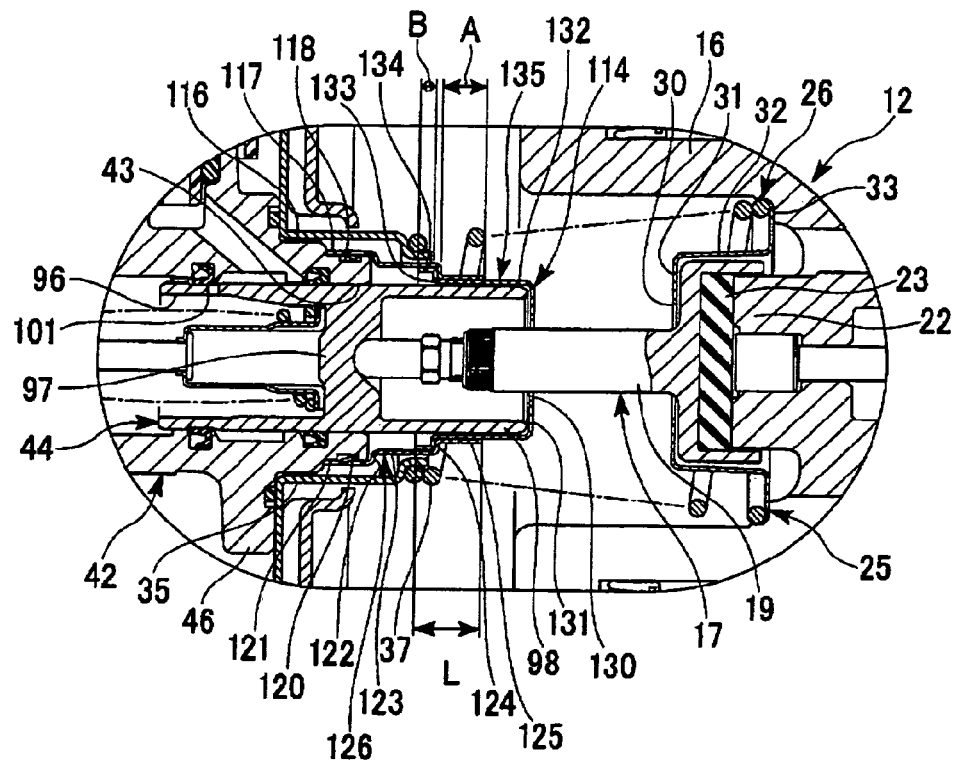
FIG. 3 is a cross-sectional view of the main parts of the master cylinder of the first embodiment of the present invention mounted on the booster when a primary piston is at the limit of a backward movement.

As shown in FIG. 3, an outer circumferential portion of the cylinder body 42 on a side closer than the flange 46 to the opening 43 comprises: an enlarged outer circumferential portion 116 on a side of the flange 46; and a reduced outer circumferential portion 117 on a side of the opening 43, the reduced outer circumferential portion 117 having a diameter smaller than that of the enlarged outer circumferential portion 116, so as to form a step. The reduced outer circumferential portion 117 is provided at an intermediate portion thereof in the cylinder axial direction with an annular engaging groove 118 that is recessed inwardly in the cylinder radial direction.

The protecting member 114 has a tubular outer cover member (first cover member) 126. The outer cover member 126 includes: an enlarged cylindrical portion 121 including a plurality of latches 120 cut and raised obliquely in a radially inward direction, the latches 120 spaced equally in a circumferential direction; a stepped portion 122 projecting in a radially inward direction from an edge of the enlarged cylindrical portion 121 located on a front side in an axial direction to which the latches 120 extend; an intermediate cylindrical portion 123 extending coaxially with the enlarged cylindrical portion 121 from an inner circumferential edge of the stepped portion 122 in a direction opposite to the enlarged cylindrical portion 121, the intermediate cylindrical portion 123 having a diameter smaller than that of the enlarged cylindrical portion 121; a stepped portion 124 projecting in a radially inward direction from an edge of the intermediate cylindrical portion 123 opposite to the enlarged cylindrical portion 121; a reduced cylindrical portion (guide portion) 125 extending coaxially with the intermediate cylindrical portion 123 from an inner circumferential edge of the stepped portion 124 in a direction opposite to the intermediate cylindrical portion 123, the reduced cylindrical portion 125 having a diameter smaller than that of the intermediate cylindrical portion 123.

Further, the protecting member 114 also has a tubular inner cover member (second cover member) 135. The inner cover member 135 includes: a disc 131 having an insertion hole 130 at a center thereof; a reduced cylindrical portion 132 extending from an outer circumferential edge of the disc 131; a stepped portion 133 projecting in a radially outward direction from a side of the reduced cylindrical portion 132 opposite to the disc 131; an enlarged cylindrical portion (enlarged diameter portion) 134 extending coaxially with the reduced cylindrical portion 132 from an outer circumferential edge of the stepped portion 133 in a direction opposite to the reduced cylindrical portion 132, the enlarged cylindrical portion 134 having a diameter larger than that of the reduced cylindrical portion 132.

In the protecting member 114, the inner cover member 135 is inserted, the disc 131 first, into the outer cover member 126 from a side of the enlarged cylindrical portion 121 of the outer cover member 126. As a result, an outer circumferential surface of the enlarged cylindrical portion 134 on one side of the inner cover member 135 is slidably fitted into an inner circumferential surface of the intermediate cylindrical portion 123 of the outer cover member 126, while an outer circumferential surface of the reduced cylindrical portion 132 on the other side of the inner cover member 135 is slidably fitted into an inner circumferential surface of the reduced cylindrical portion 125 of the outer cover member 126. In this way, the outer cover member 126 and the inner cover member 135 can be slidably moved relative to each other to extend and contract the protector member 114 in an axial direction. At this stage, the reduced cylindrical portion 125 of the outer cover member 126 guides the reduced cylindrical portion 132 of the inner cover member 135 to move, such that the inner cover member 135 is held coaxially with the outer cover member 126, while the intermediate cylindrical portion 123 of the outer cover member 126 guides the enlarged cylindrical portion 134 of the inner cover member 135 to move, such that the inner cover member 135 is held coaxially with the outer cover member 126.

The opening 43 of the cylinder body 42 and the primary piston 44 projecting from the opening 43 are inserted into the protecting member 114 from a side of the outer cover member 126 of the protecting member 114. At this stage, the enlarged cylindrical portion 121 of the outer cover member 126 is engaged with the reduced outer circumferential portion 117 on an edge of the opening 43 of the cylinder body 42 to engage the plurality of latches 120 of the enlarged cylindrical portion 121 with the engaging groove 118 of the cylinder body 42. As a result, the outer cover member 126 is secured coaxially with the cylinder body 42 at the enlarged cylindrical portion 121, one side of the outer cover member 126. In this state, the projecting portion of the primary piston 44 projecting from the cylinder body 42 is covered with the inner cover member 135 and the outer cover member 126, such that the disc 131 at the end of the inner cover member 135 abuts against the outer end surface of the primary piston 44 in the axial direction. In other words, the outer circumferential surface of the enlarged cylindrical portion 134 on one side of the inner cover member 135 is slidably engaged with the inner circumferential surface of the intermediate cylindrical portion 123 on the other side of the outer cover member 126, while the disc 131 on the other side of the inner cover member 135 abuts against an end surface of the primary piston 44. The reduced cylindrical portion 125 on the other side of the outer cover member 126 guides the inner cover member 135 to move in a direction parallel to the axis of the primary piston 44.

In the above-described manner, the protecting member 114 comprising the plurality of tubular members, the outer and inner cover members 126 and 135, can extend and contract while covering the other end of the primary piston 44 projecting from the cylinder body 42. It is to be noted that the outer cover member 126 is engaged with the cylinder body 42, such that the stepped portion 133 of the inner cover member 135, which slides on the outer cover member 126, is brought into abutment with the stepped portion 124 of the outer cover member 126 to limit the axial extension of the protecting member 114. Therefore, the primary piston 44, which abuts against the disc 131 of the inner cover member 135, is limited in a backward movement toward the booster 12 by the protecting member 114. In other words, the protecting member 114 limits a backward movement of the primary piston 44 at the other end surface of the primary piston 44 projecting from the cylinder body 42.

Further, the primary piston 44 covered with the protecting member 114 is inserted into the mounting cylindrical portion 35 of the booster 12, whereby the master cylinder 11 is mounted on the booster 12, the flange 46 abutting against the booster 12. At this stage, the enlarged outer circumferential portion 116 of the master cylinder 11 is inserted into the mounting cylindrical portion 35 of the booster 12 with a relatively small clearance between the enlarged outer circumferential portion 116 of the master cylinder 11 and the mounting cylindrical portion 35 of the booster 12, while the intermediate cylindrical member 123 of the outer cover member 126 of the protecting member 114 is inserted into the reduced cylindrical portion 37 of the booster 12 with a relatively small clearance between the intermediate cylindrical portion 123 and the reduced cylindrical portion 37 of the booster 12. Further, the output rod 17 of the booster 12 is passed through the insertion hole 130 of the inner cover member 135 of the protecting member 114 and brought into abutment with the bottom portion 97 of the primary piston 44.

Figure 4:
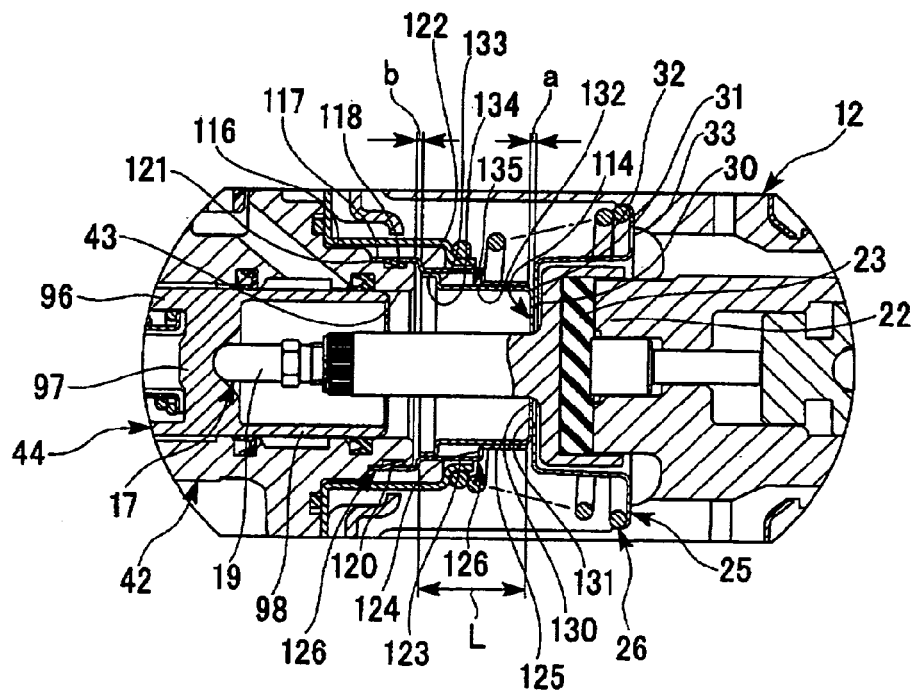
FIG. 4 is a cross-sectional view of the main parts of the master cylinder of the first embodiment of the present invention mounted on the booster when the booster is at a full stroke.

As the power piston 16 and the output rod 17 of the booster 12 move forward from the limit of a backward movement shown in FIG. 3, the primary piston 44 also moves forward in the cylinder body 42 toward the bottom portion 40. As shown in FIG. 4, when the forward movement of the output rod 17 exceeds a predetermined distance, the spring engagement cover 25, which surrounds the output rod 17, can abut and press against the disc 131 of the inner cover member 135 of the protecting member 114. According to the forward movement of the power piston 16, the reaction disc 23, the output rod 17, and the spring engagement cover 25, the inner cover member 135 slides on the outer cover member 126 fixed to the cylinder body 42 to reduce the length of the protecting member 114 as a whole. The shapes and sizes of the inner and outer cover members 135 and 126 are determined to allow the power piston 16, the reaction disc 23, the output rod 17, and the spring engagement cover 25 to move to the limit of a forward movement. In other words, the shapes and the sizes of the inner and outer cover members 135 and 126 are determined such that, even when the power piston 16, the reaction disc 23, the output rod 17, and the spring engagement cover 25 are at full stroke, there is a clearance "a" between the spring engagement cover 25 and the outer cover member 126 of the protecting member 114, as shown in FIG. 4, and there is a clearance "b" between the inner cover member 135 of the protecting member 114 and the cylinder body 42.

On the other hand, as the power piston 16, the reaction disc 23, the output rod 17, and the spring engagement cover 25 of the booster 12 move back, the inner cover member 135 is pressed by the primary piston 44 similarly moving backward to slide on the outer cover member 126 to extend the length of the protecting member 114 as a whole. Thereafter, the stepped portion 133 of the inner cover member 135 abuts against the stepped portion 124 of the outer cover member 126 to prevent the inner cover member 135 from moving any farther. In this way, the primary piston 44, which abuts against the disc 131 of the inner cover member 135, is prevented from moving any farther (in other words, the stepped portion 133 of the inner cover member 135 limits the backward movement of the primary piston 44).

In the master cylinder 11 of the first embodiment described above, one end of the primary piston 44 is inserted into the cylinder body 42, while the other end of the primary piston 44 projecting from the cylinder body 42 is covered with the protecting member 114 which can extend and contract. This prevents the exposed portion of the primary piston 44 from being damaged. Further, the protecting member 114 limits the backward movement of the primary piston 44. This eliminates the need for placing a separate stopper for limiting the backward movement of the primary piston 44. Therefore, the structure of the master cylinder 11 can be simplified, and efficiency in the entire assemblage can be improved. Further, since the protecting member 114 can extend and contract, the master cylinder 11 can be mounted on the booster 12 without removing the protecting member 114. Strokes can be ensured in a limited space of the booster 12. Further, the protecting member 114 can prevent the primary piston 44 from being removed from the cylinder body 42.

Further, since the protecting member 114 is placed at the other end of the primary piston 44 projecting from the cylinder body 42 to limit the backward movement of the primary piston 44, the protecting member 114 itself can be mounted easily. Specifically, simply by attaching the protecting member 114 to the cylinder body 42 so as to cover the primary piston 44, the disc 131 of the inner cover member 135 of the protecting member 114 serving as a stopper can be adjusted to the primary piston 44. As a result, efficiency in the entire assemblage can be further improved.

Further, since the protecting member 114 comprises a plurality of tubular members, that is, the outer and inner cover members 126 and 135, a simple structure can be ensured to cover one end of the primary piston 44 projecting from the cylinder body 42 and to limit the backward movement of the primary piston 44.

Further, as the primary piston 44 moves back, the inner cover member 135, which abuts against the end surface of the primary piston 44, engages with the primary piston 44 and slides on the outer cover member 126 which is fixedly engaged with the cylinder body 42, so that the protecting member 114 extends. With use of the protecting member 114, a simple structure can be ensured to cover the end of the primary piston 44 projecting from the cylinder body 42 and to limit the backward movement of the primary piston 44.

Further, the protecting member 114 has a tapered shape, such that the inner circumferential surface of the outer cover member 126, which is fixedly engaged with the cylinder body 42, is slidably engaged with the outer circumferential surface of the inner cover member 135, which abuts against the end surface of the primary piston 44. This can improve efficiency in use of the space.

The reduced cylindrical portion 125 of the outer cover member 126 guides the reduced cylindrical portion 132 of the inner cover member 135 to move, such that the inner cover member 135 is held coaxially with the outer cover member 126, while the intermediate cylindrical member 123 of the outer cover member 126 guides the enlarged cylindrical portion 134 of the inner cover member 135 to move, such that the inner cover member 135 is held coaxially with the outer cover member 126. In this way, the inner cover member 135 is guided to move relative to the outer cover member 126 in a direction parallel to the axis of the primary piston 44. This ensures stable, smooth movement of the inner cover member 135 without tilting it. It should be noted that, for such smooth sliding movement of the inner cover member 135 without tilting it, it is preferable to make as long as possible a sliding distance A, that is, the axial length of the reduced cylindrical portion 125 of the outer cover member 126, and a sliding distance B, that is, the axial length of the enlarged cylindrical portion 134 of the inner cover member 135. Further, as shown in FIGS. 3 and 4, a guide length L between the inner and outer cover members 135 and 126, that is, the distance between farthest ends of the enlarged cylindrical portion 134 of the inner cover member 135 and the reduced cylindrical portion 125 of the outer cover member 126, increases with a stroke of the output rod 17 of the booster 12. Therefore, even when the stroke of the output rod 17 increases, and the output rod 17 is more likely to tilt to a relatively large extent, the posture of the inner cover member 135 becomes more stable so as to correct the tilting. In order to bring the primary piston 44 into contact with the inner cover member 135 as soon as possible when the primary piston 44 is in retreat or moving backward, it is preferable to set the sliding distance A>the sliding distance B. However, it is also possible to set the sliding distance A=the sliding distance B, or the sliding distance A<the sliding distance B.

In addition, the enlarged cylindrical portion 134, which slides on the inner circumferential surface of the outer cover member 126, is formed on one side of the inner cover member 135 and is provided with the stepped portion 133 adjacent to the enlarged cylindrical portion 134. In this way, the limit of the movement of the inner cover member 135 can be easily established. This further ensures a simple structure for limiting the backward movement of the primary piston 44.

Further, when the protecting member 114 is in a state where the primary piston 44 is at the limit of backward movement, the primary and secondary supply passages 78 and 73 are communicated with the primary and secondary pressure chambers 103 and 88 by means of the primary and secondary pistons 44 and 45. Therefore, vacuum filling is enabled by the master cylinder itself.

Next, the master cylinder according to the second embodiment of the present invention will be described below mainly with reference to FIGS. 5 and 6, focusing on differences from the first embodiment. It should be noted that elements in this embodiment that correspond to ones described in the first embodiment are denoted by the same reference numerals, and detailed descriptions thereof are omitted.

Figure 5:
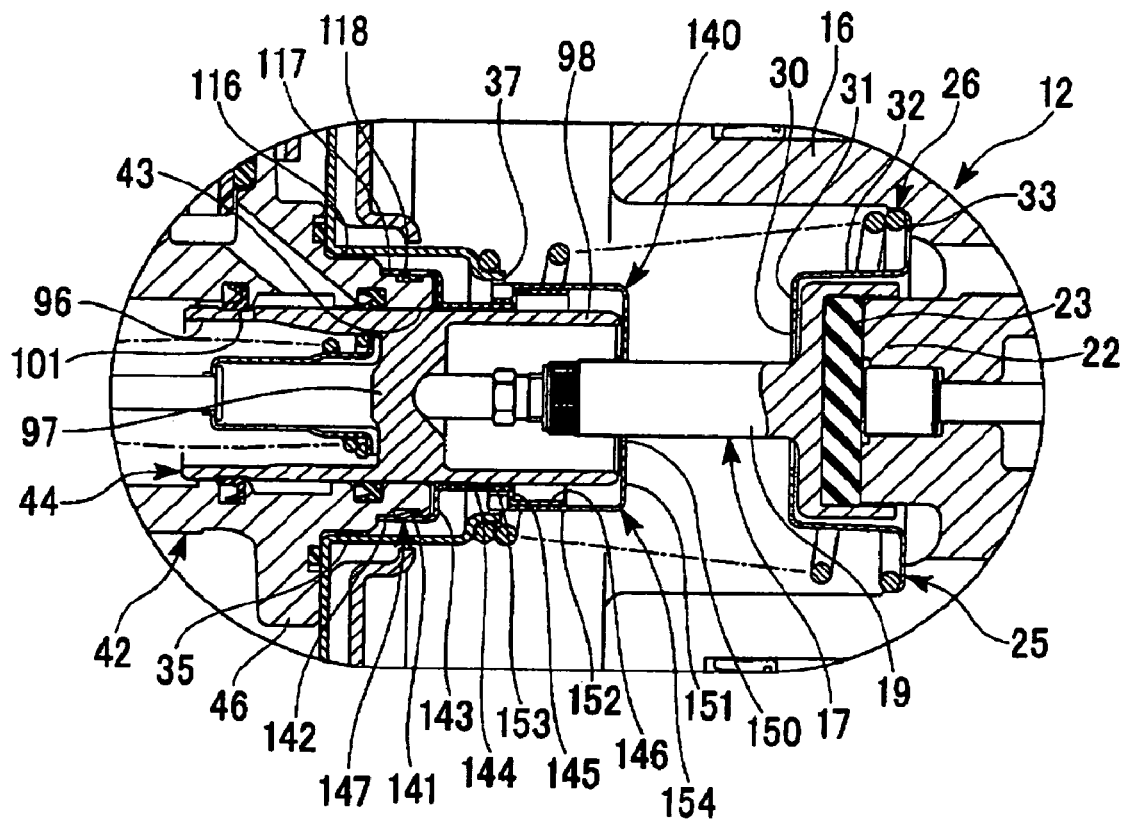
FIG. 5 is a cross-sectional view of the main parts of a master cylinder of a second embodiment of the present invention mounted on a booster when a primary piston is at the limit of a backward movement.
Figure 6:
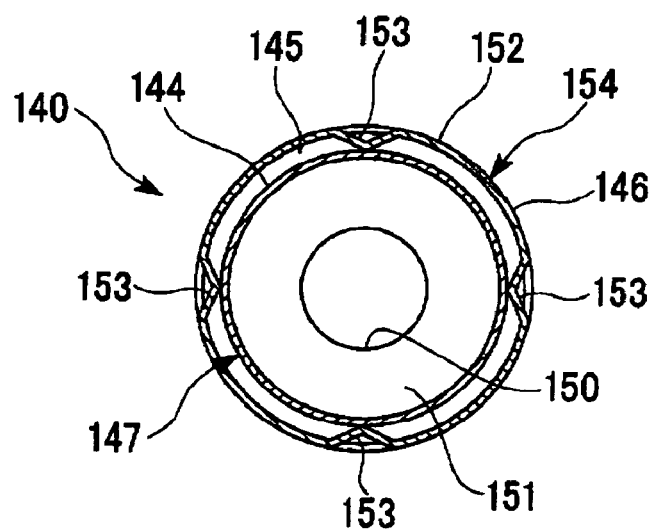
FIG. 6 is a cross-sectional view of a protecting member of the master cylinder of the second embodiment of the present invention.

As shown in FIG. 5, a protecting member 140 of the second embodiment for covering the portion of the primary piston 44 projecting from the cylinder body 42 is different from the one of the first embodiment.

The protecting member 140 has a tubular inner cover member (first cover member) 147. The inner cover member 147 includes: an enlarged cylindrical portion 142 including a plurality of latches 141 cut and raised obliquely in a radially inward direction and spaced equally in a circumferential direction; a stepped portion 143 projecting in a radially inward direction from an edge of the enlarged cylindrical portion 142 located on a front side in an axial direction to which the latches 141 extend; an intermediate cylindrical portion 144 extending coaxially with the enlarged cylindrical portion 142 from an inner circumferential edge of the stepped portion 143 in a direction opposite to the enlarged cylindrical portion 142, the intermediate cylindrical portion 144 having a diameter smaller than that of the enlarged diameter portion 142; a stepped portion 145 projecting in a radially outward direction from an edge of the intermediate cylindrical portion 144 opposite to the enlarged cylindrical portion 142; and a cylindrical portion (guide portion) 146 extending coaxially with the intermediate cylindrical portion 144 from an outer circumferential edge of the stepped portion 145 in a direction opposite to the intermediate cylindrical portion 144, the cylindrical portion having a diameter larger than that of the intermediate cylindrical portion 144.

Further, the protecting member 140 also has a tubular outer cover member (second cover member) 154. The outer cover member includes: a disc 151 having an insertion hole 150 at a center thereof; and a cylindrical portion 152 extending from an outer circumferential edge of the disc 151. The cylindrical portion 152 is partially cut on an edge of the cylindrical portion 152 opposite to the disc 151 and bent in a radially inward direction to form a plurality of bent projections 153 arranged in a circumferential direction, as shown in FIG. 6.

To form the protecting member 140, the inner cover member 147 is inserted, the cylindrical portion 146 first, through the cylindrical portion 152 into the outer cover member 154 before the bent projections 153 are formed. Then the bent projections 153 are formed. As a result, an outer circumferential surface of the cylindrical portion 146 of the inner cover member 147 is slidably engaged with an inner circumferential surface of the cylindrical portion 152 of the outer cover member 154, while an outer circumferential surface of the intermediate cylindrical portion 144 of the inner cover member 147 is slidably engaged with the bent projections 153 of the outer cover member 154. In this way, the inner and outer cover members 147 and 154 can be moved relative to each other to extend and contract the protecting member 140 in an axial direction. At this stage, the cylindrical portion 146 of the inner cover member 147 guides the cylindrical portion 152 of the outer cover member 154 to move, such that the outer cover member 154 is held coaxially with the inner cover member 147, while the intermediate cylindrical portion 144 of the inner cover member 147 guides the bent projections 153 of the outer cover member 154 to move, such that the outer cover member 154 is held coaxially with the inner cover member 147.

A portion of the cylinder body 42 on the side of the opening 43, and a portion of the primary piston 44 projecting from the opening 43 are inserted through the inner cover member 147 into the protecting member 140. At this stage, the enlarged cylindrical portion 142 of the inner cover member 147 is engaged with the reduced outer circumferential portion 117 on an edge of the opening 43 of the cylinder body 42 to fixedly engage the plurality of latches 141 of the enlarged cylindrical portion 142 with engaging groove 118 of the cylinder body 42. As a result, the enlarged cylindrical portion 142 of the inner cover member 147 is fixedly engaged with the cylinder body 42. In this way, the inner cover member 147 is fixed to the cylinder body 42. In this state, the portion of the primary piston 44 projecting from the cylinder body 42 is covered with the inner cover member 147 and the outer cover member 154. The disc 151, an end portion of the outer cover member 154, abuts against an outer end surface of the primary piston 44 in the axial direction.

In the above-described manner, the protecting member 140 comprising a plurality of tubular members, that is, the inner and outer cover members 147 and 154, can extend and contract while covering the portion of the primary piston 44 projecting from the cylinder body 42. It is to be noted that the inner cover member 147 is fixedly engaged with the cylinder body 42, such that the bent projections 153 of the outer cover member 154, which slides on the inner cover member 147, is brought into abutment with the stepped portion 145 of the inner cover member 147 to limit the axial extension of the protecting member 140. The primary piston 44, which abuts against the disc 151 of the outer cover member 154, is limited in a backward movement toward the brake pedal by the protecting member 140. In other words, the protecting member 140 limits the backward movement of the primary piston 44 at the end surface of the primary piston 44 projecting from the cylinder body 42.

Further, the primary piston 44, which is covered with the protecting member 140, is inserted into the mounting cylindrical portion of the booster 12, whereby the master cylinder 11 is mounted on the booster 12, the flange 46 abutting against the booster 12. At this stage, the enlarged outer circumferential portion 116 of the master cylinder 11 is inserted into the mounting cylindrical portion 35 of the booster 12 with a relatively small clearance between the enlarged outer circumferential portion 116 and the mounting cylindrical portion 35, while the outer cover member 154 of the protecting member 140 of the master cylinder 11 is inserted into the reduced cylindrical portion 37 of the booster 12 with a relatively small clearance between the outer cover member 154 and the reduced cylindrical portion 37. At the same time, the output rod 17 of the booster 12 is passed through the insertion hole 150 of the outer cover member 154 of the protecting member 140 and brought into abutment with the bottom portion 97 of the primary piston 44.

As the power piston 16 and the output rod 17 of the booster 12 move forward, the primary piston 44 also moves forward in the cylinder body 42 toward the bottom portion 40. Depending on the distance of the forward movement of the output rod 17, the spring engagement cover 25, which surrounds the output rod 17 can abut and press against the disc 151 of the outer cover member 154 of the protecting member 140. According to the forward movement of the power piston 16, the output rod 17, the reaction disc 23, and the spring engagement cover 25, the outer cover member 154 slides on the inner cover member 147 fixed to the cylinder body 42 to reduce the length of the protecting member 140 as a whole. As described in the first embodiment, the shapes and sizes of the outer and inner cover members 154 and 147 of the protecting member 140 are determined to allow the power piston 16, the output rod 17, the reaction disc 23, and the spring engagement cover 25 to move to the limit of forward movement.

On the other hand, as the power piston 16 and the output rod 17 of the booster 12 move backward, the outer cover member 154 is pressed by the primary piston 44 similarly moving backward to slide on the inner cover member 147 to extend the length of the protecting member 140 as a whole. Thereafter, when the bent projections 153 of the outer cover member 154 are brought into abutment with the stepped portion 145 of the inner cover member 147, the outer cover member 154 is prevented from moving any farther. As a result, the primary piston 44, which abuts against the disc 151 of the outer cover member 154, is prevented from moving any farther (in other words, limits the backward movement of the primary piston 44).

Although the above embodiments are described in terms of plunger-type master cylinders as an example, the protecting members 114 and 140 can be applied to other conventional master cylinders such as center valve type master cylinders, as long as they are overhang type master cylinders.

According to the first or second embodiment, while one side of the piston is inserted into the cylinder body, another side of the piston projecting from the cylinder body is covered with the protecting member being adapted to extend and contract. This prevents the exposed portion of the piston from being damaged. Further, the protecting member limits a backward movement of the piston. This eliminates a need for a separate stopper for limiting the backward movement of the piston. Therefore, the structure can be simplified, and efficiency in the entire assemblage can be improved.

According to the first or second embodiment, the protecting member limits the backward movement of the piston at the another side of the piston projecting from the cylinder body. Therefore, assemblage of the protecting member itself is facilitated. As a result, the efficiency in the entire assemblage can be further improved.

According to the first or second embodiment, the protecting member comprises a plurality of tubular members. Therefore, the structure for covering the another side of the piston projecting from the cylinder body and limiting the backward movement of the piston can be simplified.

According to the first or second embodiment, as the piston moves back, the second cover member abutting against an end surface of the piston is engaged with the piston and caused to slide on the first cover member that is fixedly engaged with the cylinder body, whereby the protecting member extends and contracts. In this way, a simple structure can be ensured to cover the another side of the piston projecting from the cylinder body and limit the backward movement of the piston.

According to the first or second embodiment, the protecting member is tapered, such that the outer circumferential surface of the second cover member abutting against the end surface of the piston is slidably engaged with the inner circumferential surface of the first cover member fixed to the cylinder body. Therefore, the space can be efficiently used.

According to the first or second embodiment, the guide portion of the first cover member fixed to the cylinder body guides the second cover member, which abuts against the end surface of the piston, to stably move in a direction parallel to the axis of the piston.

According to the first or second embodiment, one side of the second cover member has an enlarged diameter portion that is adapted to slide on an inner circumferential surface of the first cover member. Adjacent to the enlarged diameter portion is provided a stepped portion that enables easy setting of a limit of movement of the second cover member. This further ensures a simple structure for limiting the backward movement of the piston.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2005-346378 filed on Nov. 30, 2005 including specification, claims, drawings and summary is incorporated herein by reference in its entirety.

What is claimed is:

1. A master cylinder comprising:
a cylinder body having a tubular shape with a closed end;
a piston having one side thereof slidably inserted into the cylinder body and another side thereof projecting from the cylinder body, the piston and the cylinder body defining a pressure chamber for generating hydraulic pressure; and
a protecting member for covering said another side of the piston projecting from the cylinder body, the protecting member being adapted to extend and contract, and limit backward movement of the piston, wherein;
the protecting member comprises a first cover member having one side thereof fixedly engaged with the cylinder body, and a second cover member having one side thereof slidably engaged with another side of the first cover member;
an outer circumferential surface of the one side of the second cover member is slidably engaged with an inner circumferential surface of the another side of the first cover member; and
the one side of the second cover member has an enlarged diameter portion which is adapted to slide on the inner circumferential surface of the first cover member.

2. A master cylinder according to claim 1, wherein the another side of the first cover member has a guide portion for guiding the second cover member to move in a direction parallel to an axis of the piston.

3. A master cylinder according to claim 1, wherein the protecting member limits the backward movement of the piston at the another side of the piston projecting from the cylinder body.

4. A master cylinder according to claim 3, wherein the axial extension of the second cover member is limited relative to the first cover member; and another side of the second cover member is provided with a disc that has an insertion hole at a center thereof, and the disc abuts against another end surface of the piston projecting from the cylinder body.

5. A master cylinder according to claim 3, wherein the another side of the first cover member has a guide portion for guiding the second cover member to move in a direction parallel to an axis of the piston.

6. A master cylinder comprising:
a cylinder body having a tubular shape with a closed end;
a piston having one side slidably inserted into the cylinder body and another side projecting from the cylinder body, the piston and the cylinder body defining a pressure chamber for generating hydraulic pressure; and
a protecting member for covering the another side of the piston projecting from the cylinder body, the protecting member being adapted to extend and contract, and limit backward movement of the piston,
wherein the protecting member comprises;
a first cover member having one side and another side, said one side being attached to the cylinder body;
a second cover member having one side and another side, the second cover member and the first cover member being adapted to cover the one side of the piston projecting from the cylinder body, wherein
the one side of the second cover member is slidably engaged with the another side of the first cover member, wherein the protecting member is capable of extending and contracting, and
wherein the protecting member has a restricting member for preventing the second cover member from being removed from the first cover member and for limiting backward movement of the piston relative to the cylinder body,
wherein the restricting member comprises an enlarged diameter portion formed on one side of the second cover member, the enlarged diameter portion being adapted to slide on the inner circumferential surface of the first cover member.

7. A master cylinder comprising:
a cylinder body having a tubular shape with a closed end;
a piston having one side thereof slidably inserted into the cylinder body and another side thereof projecting from the cylinder body, the piston and the cylinder body defining a pressure chamber for generating hydraulic pressure; and
a protecting member for covering the another side of the piston projecting from the cylinder body, the protecting member being adapted to extend and contract, and limit backward movement of the piston,
wherein an output rod of a booster is adapted to abut against the piston, such that the protecting member contracts when forward movement of the output rod exceeds a predetermined distance.

8. A master cylinder according to claim 7, wherein the protecting member abuts against the output rod and contracts when forward movement of the output rod exceeds a predetermined distance.

9. A master cylinder according to claim 7, wherein the protecting member comprises a first cover member having one side thereof fixedly engaged with the cylinder body, and a second cover member having one side thereof slidably engaged with another side of the first cover member, and
when movement of the output rod exceeds a predetermined distance, the output rod and the second cover member abut against each other and move forward together such that the protecting member contracts.

10. A master cylinder according to claim 7, wherein the protecting member comprises a first cover member having one side thereof fixedly engaged with the cylinder body, and a second cover member having one side thereof slidably engaged with another side of the first cover member, and
the one side of the second cover member has an enlarged diameter portion that is adapted to slide on the inner circumferential surface of the first cover member.

11. A master cylinder according to claim 8, wherein the protecting member comprises a first cover member having one side that is fixedly engaged with the cylinder body, and a second cover member having one side that is slidably engaged with another side of the first cover member, and
the one side of the second cover member has an enlarged diameter portion that is adapted to slide on the inner circumferential surface of the first cover member.

12. A master cylinder according to claim 8, wherein the protecting member comprises a first cover member having one side that is fixedly engaged with the cylinder body, and a second cover member having one side that is slidably engaged with another side of the first cover member, and an outer circumferential surface on one side of the second cover member is slidably engaged with an inner circumferential surface on another side of the first cover member.

13. A master cylinder according to claim 8, wherein the protecting member comprises a first cover member having one side that is fixedly engaged with the cylinder body, and a second cover member having one side that is slidably engaged with another side of the first cover member, and an inner circumferential surface on one side of the second cover member is slidably engaged with an outer circumferential surface on another side of the first cover member.

14. A master cylinder according to claim 10, wherein the another side of the first cover member has a guide portion for guiding the second cover member to move in a direction parallel to an axis of the piston.

15. A master cylinder according to claim 7, wherein the protecting member limits backward movement of the piston at the another side of the piston projecting from the cylinder body.

16. A master cylinder according to claim 8, wherein the protecting member limits backward movement of the piston at the another side of the piston projecting from the cylinder body.

17. A master cylinder according to claim 7, wherein the protecting member comprises a first cover member having one side that is fixedly engaged with the cylinder body; and a second cover member having one side that is slidably engaged with another side of the first cover member, the second covering member being limited in axial extension thereof relative to the first cover member, and the second cover member of the protecting member abuts against another side of the piston projecting from the cylinder body so as to limit backward movement of the piston.

18. A master cylinder according to claim 17, wherein the protecting member comprises a disc on another side of the second cover member, the disc having an insertion hole at a center thereof, and the disc is adapted to abut against an end surface on another side of the piston projecting from the cylinder body.

19. A master cylinder according to claim 15, wherein the protecting member comprises a first cover member having one side that is fixedly engaged with the cylinder body, and a second cover member having one side that is slidably engaged with another side of the first cover member, and the one side of the second cover member has an enlarged diameter portion that is adapted to slide on the inner circumferential surface of the first cover member.

20. A protecting member for covering one side of a piston projecting from a cylinder body of a master cylinder, the protecting member comprising:

a first cover member having one side and another side, said one side being attached to the cylinder body;

a second cover member having one side and another side, the second cover member and the first cover member being adapted to cover the one side of the piston projecting from the cylinder body, wherein the one side of the second cover member is slidably engaged with the another side of the first cover member, wherein the protecting member is capable of extending and contracting, wherein the protecting member has a restricting member for preventing the second cover member from being removed from the first cover member and for limiting backward movement of the piston relative to the cylinder body, and wherein the restricting member comprises an enlarged diameter portion formed on one side of the second cover member, and the enlarged diameter portion is adapted to slide on the inner circumferential surface of the first cover member.

* * * * *